United States Patent [19]

Howard

[11] Patent Number: 4,710,942
[45] Date of Patent: Dec. 1, 1987

[54] VARIABLE POWER GAS LASER TUBE

[75] Inventor: P. Guy Howard, Junction City, Oreg.

[73] Assignee: Spectra-Physics, Inc., San Jose, Calif.

[21] Appl. No.: 834,289

[22] Filed: Feb. 27, 1986

[51] Int. Cl.[4] .............................................. H01S 3/097
[52] U.S. Cl. ........................................ 372/87; 372/31;
372/33; 372/88
[58] Field of Search ..................... 372/29, 31, 61, 62,
372/76, 81, 86, 87, 88, 33, 25, 69, 82

[56] References Cited

U.S. PATENT DOCUMENTS

| | | | |
|---|---|---|---|
| 3,402,367 | 9/1968 | Kobayashi | 372/88 |
| 3,967,214 | 6/1976 | Thatcher | 372/29 |
| 4,590,599 | 5/1986 | Kawakubo et al. | 372/88 |
| 4,631,727 | 12/1986 | Crane et al. | 372/33 |

OTHER PUBLICATIONS

Iijima et al; "Small Hollow Cathode Laser Tube with Direct Current Excitation"; Jan. 1979; Oyo Butur (Japan), vol. 48, No. 1; pp. 48–50.

*Primary Examiner*—James W. Davie
*Assistant Examiner*—Bertha Randolph
*Attorney, Agent, or Firm*—Donald C. Feix; T. M. Freiburger; Paul Davis

[57] ABSTRACT

A gas laser construction includes a second anode in the vicinity of the cathode, so that current can be directed through the second anode when the laser is at low current levels, thereby assuring an adequate supply of electrons around the cathode to avoid flicker in the laser output. Current flow can be controlled between the main anode at the anode end and this second anode, so that the second anode is used only when and to the extent needed. In this way, the power output of the gas laser is more dependably controlled by controlling the current level, even at low current levels, without output flicker which would ordinarily occur.

8 Claims, 4 Drawing Figures

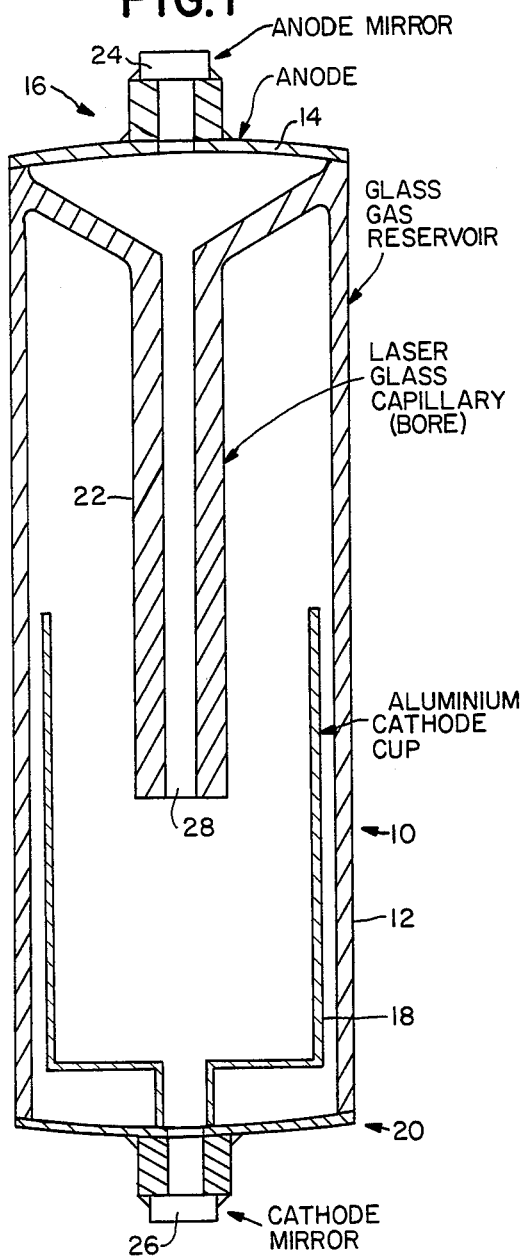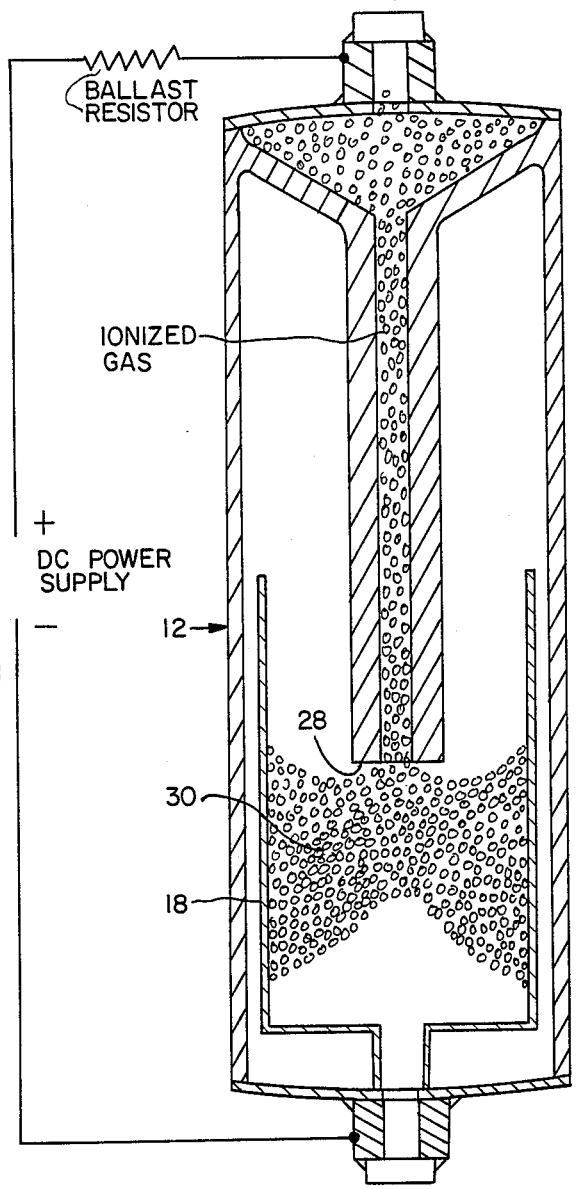

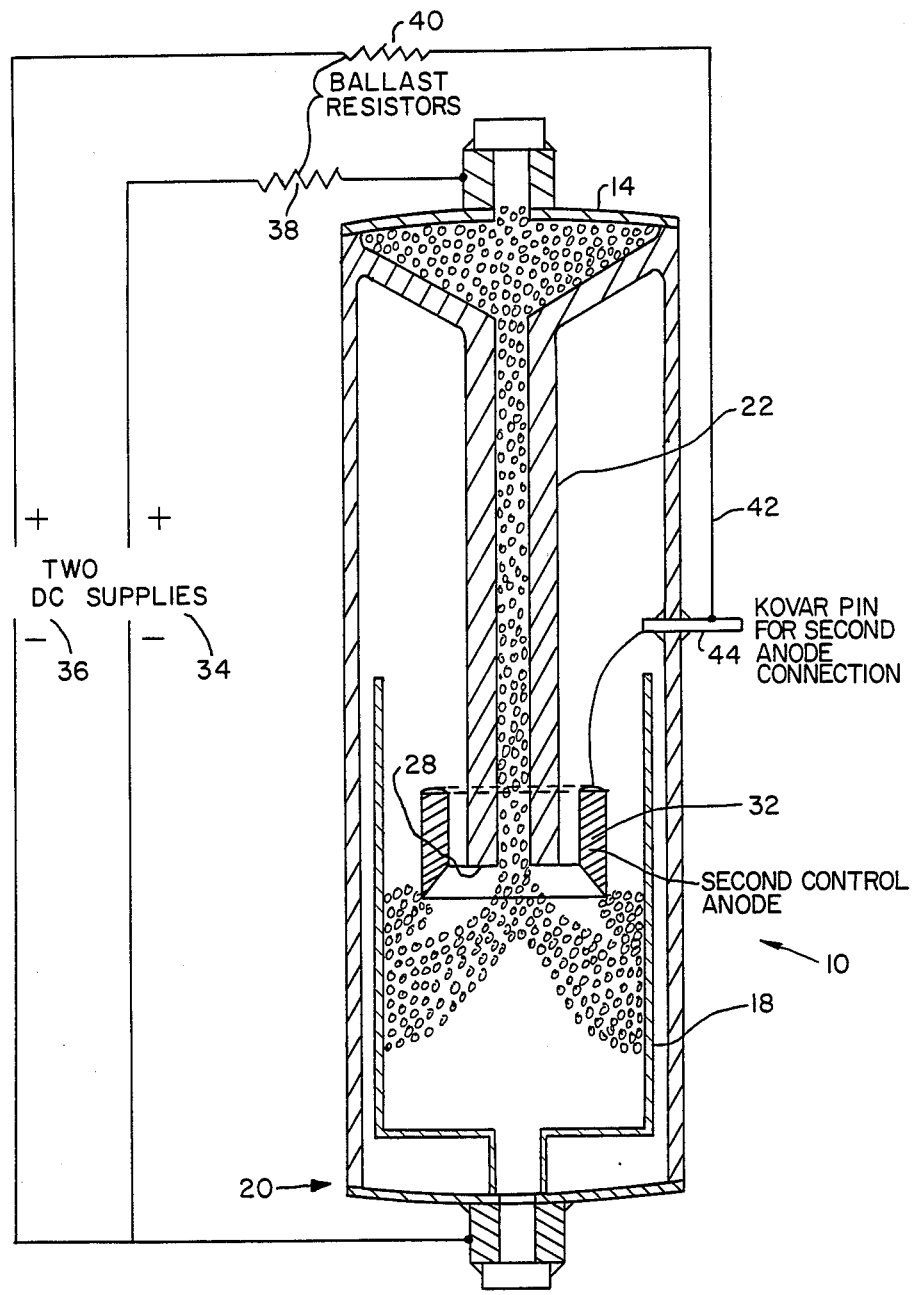

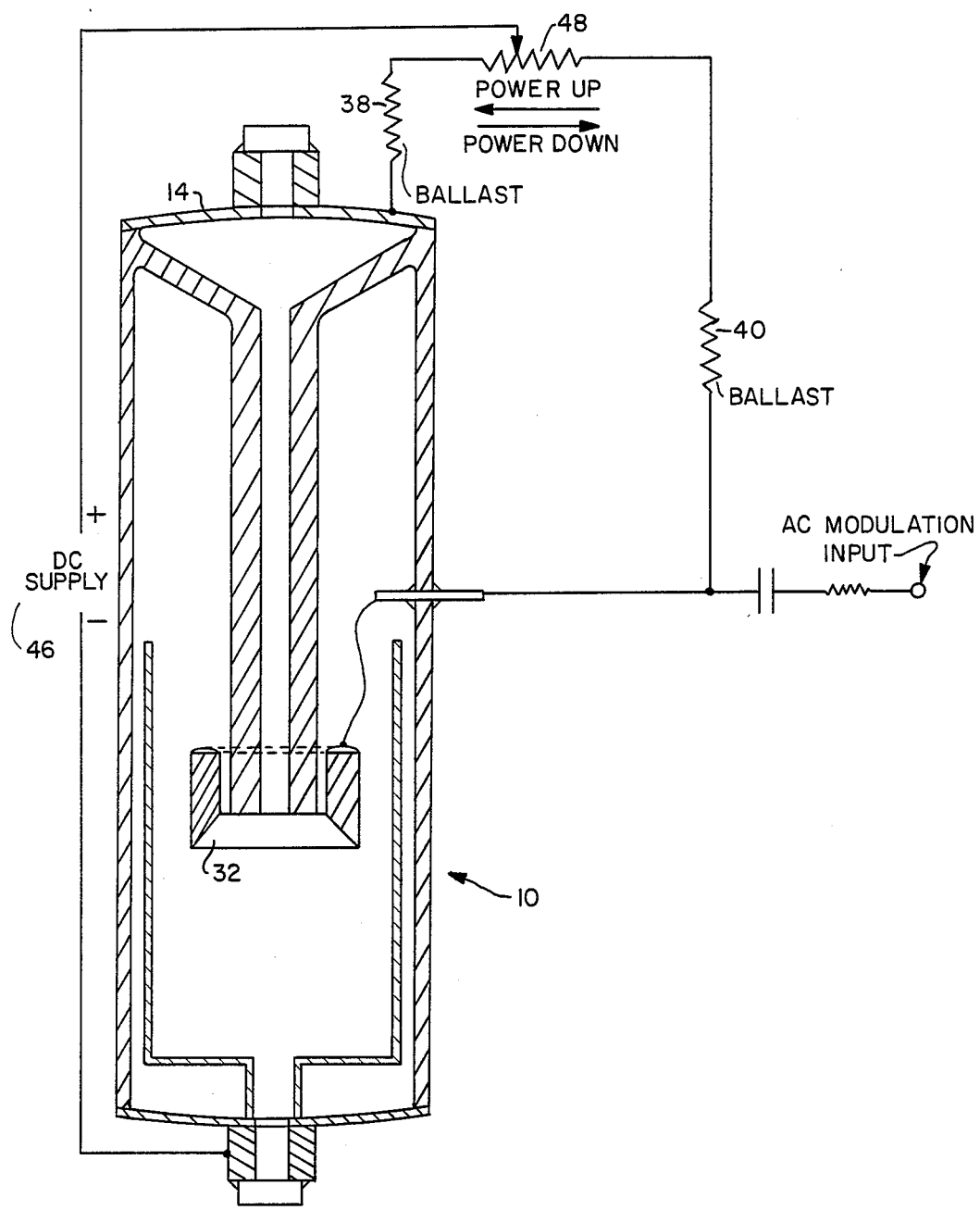

VARIABLE POWER GAS LASER TUBE

BACKGROUND OF THE INVENTION

The invention relates to gas lasers, and in particular to adjustability of the output power of a helium-neon laser.

Helium-neon lasers have not been sufficiently adjustable in output power for many application. Variation of certain electric parameters, such as changing the current in the tube, can be used to adjust the power, but there are problems associated with this approach.

The principal problem with modulating beam power through variation of the current in the plasma tube has been that when the current is reduced in the helium-neon tube, the plasma begins to flicker, as if going on and off. The tube becomes unstable, with very high noise, and it becomes difficult to produce a stable output beam.

Various attempts have been made previously to overcome this problem. One method was to raise the gas pressure in the tube, and run the tube at much higher currents, causing a loss of efficiency. Also, optical noise problems can result with this approach.

The lasing phenomenon in a helium-neon tube is not very fast. Once the plasma is ionized, the photons must bounce back and forth between the cavity end mirrors to establish lasing. Several hundred bounces are required before there is any significant lasing. This limits the speed at which the laser can be modulated by directly modulating the plasma.

It appears that what happens at low current levels in the tube is that the density of electrons in the vicinity of the cathode becomes sparse and unstable, so that the cathode intermittently goes out and there is a failure of the plasma to conduct until the voltage build-ups.

Many important uses could be made of a helium-neon laser if the power could be regulated by changing the current in the tube, achieving modulation of the tube power to a reasonable depth. It is an object of the present invention to provide a gas laser tube capable of such modulation.

SUMMARY OF THE INVENTION

In accordance with the invention, method and apparatus are provided for enabling the power output of a gas laser, particularly a cold cathode gas laser, to be controlled dependably by controlling current level in the laser, avoiding flickering of the laser and noise at low current levels as would otherwise occur.

A second anode is included in the laser tube, in the vicinity of the cathode within the cathode end of the tube. The second anode, which may be annularly shaped and in surrounding relationship to the end of the capillary tube, assures a consistently adequate supply of electrons in the vicinity of the cathode even at low current levels. In this way, laser output flicker and noise due to too-low density of electrons is avoided.

The second anode conducts plasma to the cathode concurrently with the main anode of the laser, and there preferably is included an external ballast resistor leading to each anode, with a potentiometer to divide current flow between the two. Both the main anode and the second anode are current limited by the external ballast resistors.

With the system of the invention, as current is reduced in the capillary tube of a gas laser to modulate power, electron flow about the cathode is stimulated by the presence of the second anode.

The second anode causes plasma to exist at sufficient density in the vicinity of the cathode, pulling an electron cloud into this vicinity. With the current controlled between the two anodes to raise current at one anode while lowering the current at the other, the cathode activity may be kept roughly constant, and there is an electron field keeping the cathode working even when the capillary bore current becomes extremely low.

Thus, the bore current can be reduced to quite low levels, to dependably control the laser output power.

In accordance with the invention, a reasonable modulation depth is acheived in a gas laser such as a helium-neon laser, at moderate frequency. The ability to modulate the laser to relatively low power levels acheives significant performance advantages, useful in a number of applications such as bar code scanners.

By the method and apparatus of the invention, the plasma in the cathode region is kept active even while the current is reduced in the capillary bore tube. The power vs. current range of a helium-neon laser is thereby extended, with low noise effect, by eliminating flicker which would ordinarily occur in these ranges.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWINGS

FIG. 1 is a somewhat simplified longitudinal cross-sectional view of a helium-neon laser tube, of one general type which may incorporate the features of the present invention. In FIG. 1 the tube is shown without the modifications according to the invention.

FIG. 2 is a view similar to FIG. 1, but showing the tube connected to a power supply and charged with ionized gas, and indicating approximately an ionized gas distribution in the cathode of the tube.

FIG. 3 is another similar view, showing the tube incorporating modifications according to the invention, with a second anode supplied by a second power supply and showing an approximate resulting ionized gas distribution.

FIG. 4 is another similar view, but showing an alternative system of powering and control for the two-anode tube of FIG. 3.

DESCRIPTION OF THE PREFERRED EMBODIMENTS

In the drawings, FIG. 1 shows a helium-neon laser generally identified by the reference number 10, of the type to which the present invention generally relates. The laser 10 includes a plasma tube or outer envelope 12, which is sealed and substantially evacuated, an anode 14 at an anode end 16, a cathode 18 at a cathode end 20 of the laser, an internal capillary tube 22, and end mirror/window assemblies 24 and 26.

The cathode 18 is a conductive metal member which may be generally cup-shaped as indicated, extending through a significant portion of the length of the laser 10 and in surrounding relation to an open end 28 of the capillary tube 22.

In FIG. 2 the laser 10 is shown with an example of ionized gas 30 distribution between the open end 28 of the capillary and the cathode 18. As discussed above, at low current levels in the tube 12, as when one attempts to reduce the power of a gas laser of this sort by reducing the current level, there will at some point be introduced a flickering of the plasma and of the laser beam output, and there are indications that one primary cause of this phenomenon is an inadequate supply of electrons in the cathode region 30 at such low current levels.

In accordance with the present invention, and as shown in FIG. 3, a second anode 32 is provided in the vicinity of the cathode 18 to induce an adequate electron cloud to remain at all times in the vicinity of the cathode, by an additional ionizing of the gas in the cathode region, and thereby to prevent flickering. The second anode 32 shown in FIG. 3 may be annular in shape, surrounding the capillary tube 22 near its end 28, and within the space defined by the cup-shaped cathode 18. However, this is merely one example, and the anode 32 may be located at various different places near the cathode end 20 of the laser tube, in an optimum position to maintain the needed supply of electrons in the vicinity of the cathode 18 and of the end 28 of the capillary tube.

In FIG. 3 a means is shown for differentially controlling the current to the two anodes 14 and 32, comprising two separate power supplies 34 and 36, each in a circuit with a ballast resistor 38, 40. As known in the prior art, ballast resistors may be used to overcome the negative resistance of the ionized gas.

As shown in FIG. 3, the second anode 32 may be supplied by a lead 42 connected into the gas reservoir via a conductive pin 44, such as of the thermally compatible material Kovar. The pin 44 may be fused through the wall of the tube 12 in a sealed connection.

In controlling the power of the laser 10, power is increased by increasing power to the main anode 14 while decreasing power to the second anode 32, keeping cathode current approximately constant. Conversely, when laser power is decreased, power to the main anode 14 is lowered while power to the second anode 32 is raised.

FIG. 4 shows another form of control for the laser 10, wherein power from a single power supply is divided between ballast resistors 38 and 40 by a potentiometer.

As also indicated in FIG. 4, the system can also include a modulation input, in this example an AC modulation, for modulating the output power of the laser to a reasonable depth.

It should be understood that the disclosed means of external control for current flow between the two anodes are only examples, and any suitable control means can be used.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. In a gas laser having a plasma tube, a cathode at a cathode end, an anode at an anode end and two mirror assemblies, an improved construction for enabling power output to be controlled dependably by controlling current level in the laser, without flickering of said laser at low current levels as would otherwise occur, comprising second anode means in the vicinity of the cathode positioned within the cathode end of the plasma tube, for assuring a consistently adequate supply of electrons in the vicinity of the cathode even at low current levels, so that laser output flicker due to electron starvation is avoided.

2. The improvement defined in claim 1, wherein the second anode means comprises a generally annular second anode positioned adjacent to the cathode.

3. The improvement of claim 1, further including current directing means for adjusting the relative flow of current between the second anode means and said anode at the anode end, as required in accordance with current level and the density of electrons in the vicinity of the cathode.

4. The improvement defined in claim 1, wherein the gas laser is a helium-neon laser with a capillary tube and a generally cylindrical cathode positioned around one end and a portion of the capillary tube, and wherein the second anode means comprises a generally annular second anode positioned within the space defined by said cathode and near the end of the capillary tube.

5. The improvement defined in claim 1, including a separate power supply for each anode, for increasing current to one anode while decreasing current to the other, and vice versa.

6. The improvement defined in claim 1, including a single power supply, a potentiometer connected to the positive side of the power supply, and a ballast resistor connected to each output side of the potentiometer, one of the ballast resistors leading to the anode at the anode end and the other to the second anode.

7. A method for controlling the power output of a gas laser having a first anode and a cathode by controlling current level, and avoiding output beam flicker at low current levels, comprising:
 providing in the vicinity of said cathode within the plasma tube of said laser a second anode for increasing the density of electrons at said cathode when needed at low current levels, and
 shifting current between said two anodes in accordance with operating conditions of said laser, including directing more current through the second anode at low current levels when beam flicker could ordinarily be expected.

8. The method of claim 7, including controlling the current in said two anodes by increasing current to one anode while decreasing current to the other.

* * * * *